(12) United States Patent
Speed

(10) Patent No.: US 10,943,467 B1
(45) Date of Patent: Mar. 9, 2021

(54) CENTRAL ALARM STATION INTERFACE FOR SITUATION AWARENESS

(71) Applicant: National Technology & Engineering Solutions of Sandia, LLC, Albuquerque, NM (US)

(72) Inventor: Ann E. Speed, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/662,653

(22) Filed: Oct. 24, 2019

(51) Int. Cl.
*G08B 13/00* (2006.01)
*G08B 29/18* (2006.01)
*G08B 25/14* (2006.01)
*G06F 9/451* (2018.01)

(52) U.S. Cl.
CPC .......... *G08B 29/185* (2013.01); *G06F 9/451* (2018.02); *G08B 25/14* (2013.01)

(58) Field of Classification Search
None
See application file for complete search history.

(56) References Cited

U.S. PATENT DOCUMENTS

| | | | |
|---|---|---|---|
| 9,082,156 B2* | 7/2015 | Matos | G06Q 50/22 |
| 2007/0008099 A1* | 1/2007 | Kimmel | G08B 13/19656 340/506 |
| 2009/0045937 A1* | 2/2009 | Zimmerman | G08B 17/00 340/506 |
| 2011/0169637 A1* | 7/2011 | Siegler, II | G08B 13/2494 340/541 |
| 2012/0250834 A1* | 10/2012 | Smith | G08B 25/006 379/45 |
| 2015/0077737 A1* | 3/2015 | Belinsky | G08B 17/103 356/51 |
| 2016/0322078 A1* | 11/2016 | Bose | A63F 13/217 |
| 2017/0213447 A1* | 7/2017 | Horrocks | G08B 19/00 |
| 2018/0232592 A1* | 8/2018 | Stewart | G08B 13/19684 |

* cited by examiner

*Primary Examiner* — Brent Swarthout
(74) *Attorney, Agent, or Firm* — Yee & Associates, P.C.

(57) ABSTRACT

A method for analyzing security alarms is provided. The method comprising receiving alarm data from a number of security sensors generating alarms, wherein the alarm data includes spatio-temporal data regarding where and when an alarm is triggered. The alarm data is displayed on a user interface. The alarm data is analyzed for spatio-temporal relationships among the alarms according to a number of pattern recognition algorithms. The alarms are identified as genuine alarms if a discernable pattern is recognized among the alarms.

20 Claims, 6 Drawing Sheets

CENTRAL ALARM STATION INTERFACE FOR SITUATION AWARENESS

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to security systems, and more specifically to improved distinction of genuine threats from false or nuisance alarms.

2. Description of the Related Art

Area security systems typically comprise a number of sensors monitoring a specified geographic area and/or facility. Information from these sensors are typically fed to a central interface or monitoring station to facilitate supervision by security personnel.

A challenge facing security personnel monitoring the security system is processing the incoming information from the various sensors and maintaining proper situation awareness in the face of voluminous, and often distracting, information. Random events and conditions such as, e.g., sensor malfunctions, weather activity, or animals on the premises can trigger false alarms or nuisance alarms that have to be distinguished from genuine threats. However, before such false or nuisance alarms can be distinguished and dismissed, they must first be properly identified as such, which requires time and resources. The distraction of having to frequently investigate and identify false and nuisance alarms, in addition to being time and resource consuming, can cause security personnel to lose situation awareness by focusing on the trees instead of the forest, so to speak. This problem is exacerbated by the very randomness of false and nuisance alarms.

Therefore, it would be desirable to have a method and apparatus that take into account at least some of the issues discussed above, as well as other possible issues.

SUMMARY

An illustrative embodiment provides computer-implemented method of analyzing security alarms. The method comprising receiving alarm data from a number of security sensors generating alarms, wherein the alarm data includes spatio-temporal data regarding where and when an alarm is triggered. The alarm data are displayed on a user interface. The alarm data are analyzed for spatio-temporal relationships among the alarms according to a number of pattern recognition algorithms. The alarms are identified as genuine alarms if a discernable pattern is recognized among the alarms.

Another illustrative embodiment provides a computer program product for analyzing security alarms. The computer program product comprises a non-volatile computer readable storage medium having program instructions embodied therewith, the program instructions executable by a number of processors to cause the computer to perform the steps of: receiving alarm data from a number of security sensors generating alarms, wherein the alarm data includes spatio-temporal data regarding where and when an alarm is triggered; displaying the alarm data on a user interface; analyzing the alarm data for spatio-temporal relationships among the alarms according to a number of pattern recognition algorithms; and identifying the alarms as genuine alarms if a discernable pattern is recognized among the alarms.

Another illustrative embodiment provides a system for analyzing security alarms. The system comprises a bus system; a number of storage devices connected to the bus system, wherein the storage devices store program instructions; and a number of processors connected to the bus system, wherein the number of processors execute the program instructions to: receive alarm data from a number of security sensors generating alarms, wherein the alarm data includes spatio-temporal data regarding where and when an alarm is triggered; display the alarm data on a user interface; analyze the alarm data for spatio-temporal relationships among the alarms according to a number of pattern recognition algorithms; and identify the alarms as genuine alarms if a discernable pattern is recognized among the alarms.

The features and functions can be achieved independently in various examples of the present disclosure or may be combined in yet other examples in which further details can be seen with reference to the following description and drawings.

DETAILED DESCRIPTION

The illustrative embodiments recognize and take into account one or more different considerations. For example, the illustrative embodiments recognize and take into account that security systems often produce false or nuisance alarms that must be investigated by personnel, consuming time and resources.

The illustrative embodiments also recognize and take into account that frequent investigation of false and nuisance alarms can result in security personnel to lose situation awareness and compromise their ability to accurately distinguish genuine threats in the midst of numerous false and/or nuisance alarms.

The illustrative embodiments also recognize and take into account that false and nuisance alarms are random and typically have no discernable pattern that would characterize a legitimate threat situation.

Illustrative embodiments provide an intrusion detection system interface that uses spatio-temporal information related to alarms to present critical information to an operator to assist with identification of legitimate threat situations, as distinguished from false and nuisance alarms, and enable the operator to maintain overall situational awareness.

Figure 1:
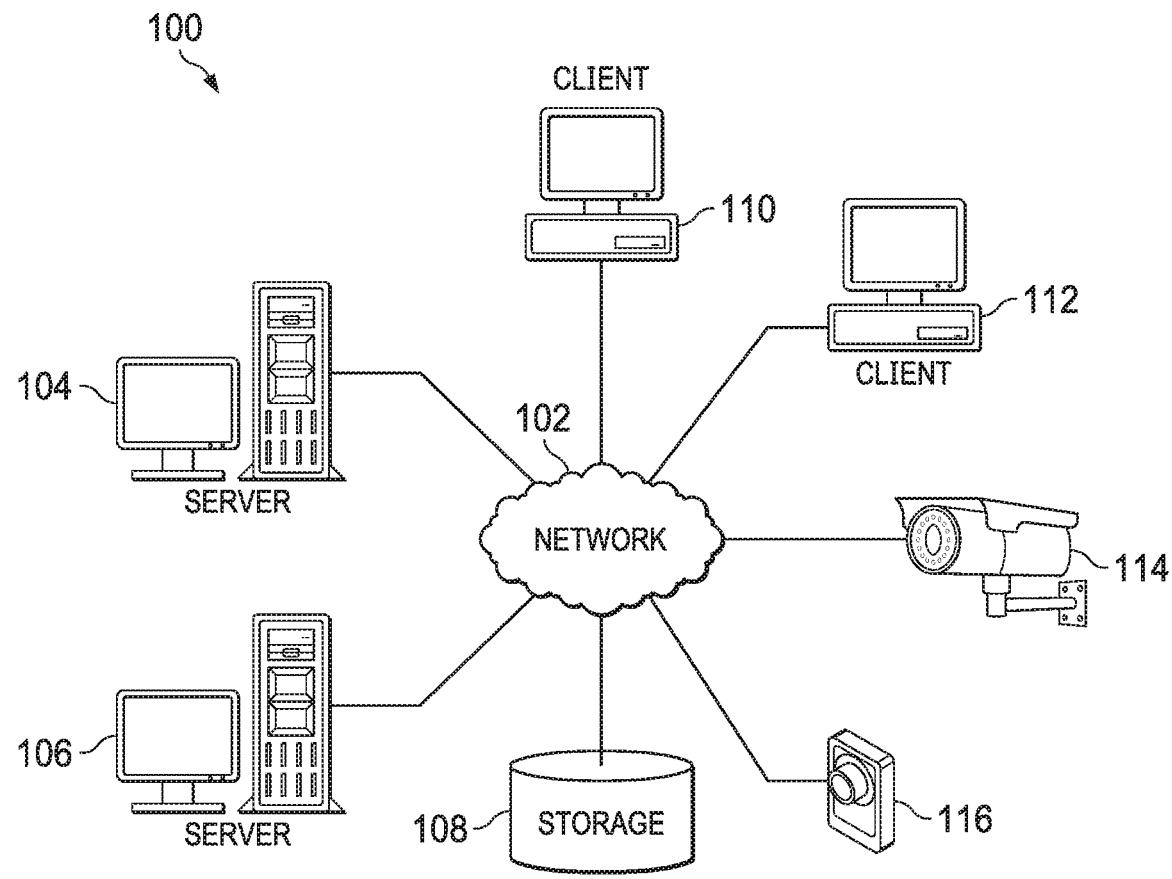
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices include client computer 110, client computer 112, camera 114, and motion detector 116. Client computer 110, client computer 112, camera 114, and motion detector 116 connect to network 102. These connections can be wireless or wired connections depending on the implementation. Client computer 110 and client computer 112 might be, for example, personal computers or network computers. Camera 114 might be, e.g., a visible light camera, low-light night vision camera, or infrared (IR) camera.

In the depicted example, server computer 104 provides information, such as boot files, operating system images, and applications to client computer 110 and client computer 112. Client computer 110, client computer 112, camera 114, and motion detector 116 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client devices may be used in addition to or in place of client computer 110, client computer 112, camera 114, and motion detector 116 as depicted in FIG. 1. For example, client computer 110, and client computer 112 might include a tablet computer, a laptop computer, a bus with a vehicle computer, and other suitable types of clients. Other types of detection devices might also be client devices.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
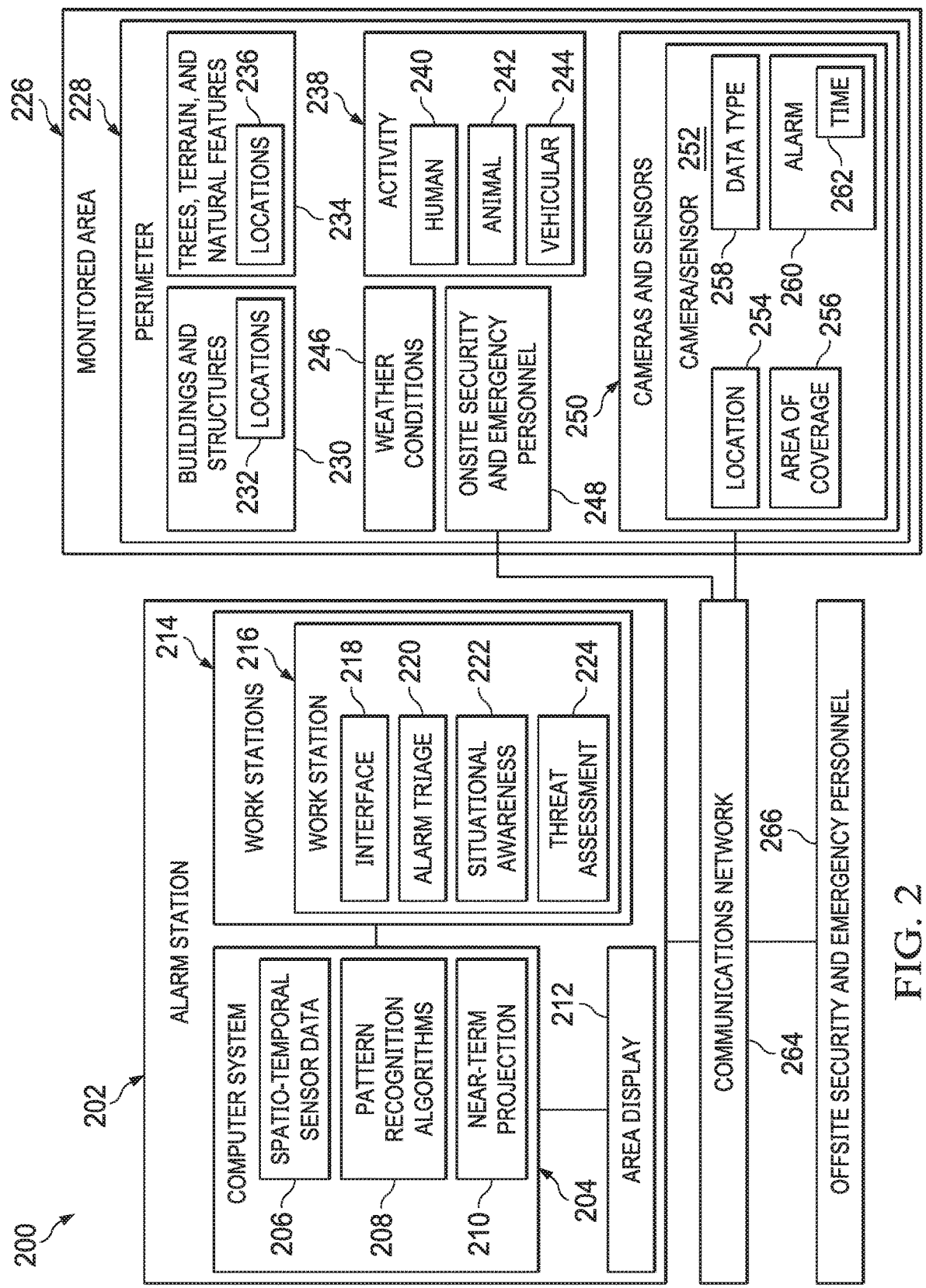
FIG. 2 depicts a block diagram for a security system in which illustrative embodiments can be implemented.

FIG. 2 depicts a block diagram for a security system in which illustrative embodiments can be implemented. Security system 200 provides security to monitored area 226 and comprises a number of cameras and/or sensors 250 the supply information to operators at alarm station 202 and might be implemented with a network data processing system such as system 100 in FIG. 1. Alarm station 202 might be on the premises of monitored area 226 or offsite.

Monitored area 226 comprises a perimeter 228 within which security services are provided. Monitored area 202 might comprise buildings and other manmade structures 230 with respective locations 232 inside perimeter 228. Monitored area 226 might also encompass trees, terrain, and other natural features 234 with their own respective locations 236 inside perimeter 228. These natural features 234 might present challenges in monitoring the premises as well as presenting navigation obstacles.

A number of cameras and/or sensors 250 might monitor the monitored area 226 both within perimeter 228 as well as the boundary of the perimeter 228 itself. Each camera/sensor 252 is positioned at a specific location 254 within monitored area 226 and has a respective area of coverage 256 related to that location. The area of coverage 256 might comprise a field of view in the case of a camera or motion detector. Alternatively, area of coverage 256 might be as simple as a door, window, gate, or similar point of access. Each camera/sensor generates a specific data type 258. In the case of a camera, data type 258 might comprise still images or video within a defined spectrum such as visible light or infrared, or light-amplified night vision. Data type 258 might be a simple indication that a point of access has been breached or opened. If the sensor 252 is a motion detector, data type 258 might comprise a simple indication of movement within area of coverage 256. Motion sensors might also be used in conjunction with cameras to supplement video data or to serve as activating triggers for cameras that cover overlapping areas of coverage as the motion sensors.

Data from the cameras and sensors 250 is transmitted to alarm station 202 via a communications network 264, enabling operators at alarm station 202 to oversee monitored area 226, respond to alarms, and direct security personnel as needed.

Alarm station 202 might receive and process routine monitoring data as well as alarms. What constitutes an alarm or triggers an alarm might depend on a number of factors, such as the location of a sensor, the type of sensor, and the time of day. For example, if perimeter 228 is defined by a fence, activation of a sensor along the fence might trigger or constitute an alarm since such a location is not considered a normal point of access. As another example, breach sensors on doors and window might only be active during specified periods (e.g., nights and weekends) or be continually active but only trigger associated alarms during such specified periods. Similarly, motion sensors located on the periphery of monitored area 226 might be continually active, whereas motion sensors covering areas subject to regular human foot traffic or vehicular traffic might not be active during defined normal business/operating hours, or alarms associated with such sensors are not operable during these hours.

For purposes of the present discussion, it is assumed alarm station 202 is responding to actual triggered alarms and that the distinction between alarms and routine monitoring of normal activity is not at issue.

Alarms can be triggered by a number of causes, some benign and some not. Distinguishing between benign alarms and genuine threats is one of the main challenges facing the alarm station. For purposes of the present discussion, false alarms can be defined as alarms triggered by some type of equipment malfunction rather than an external cause. In contrast, a nuisance alarm comprises a genuine activation of an alarm sensor by an external cause that does not constitute a true security threat. In other words, with a nuisance alarm the sensor and alarm are functioning properly but the external cause triggering the alarm is benign, e.g., wild animal triggering motion sensor. As a practical matter nuisance alarms typically comprise the majority of alarms that alarm station operators must address.

External triggers of alarms might comprise activity 238 such as human foot traffic 240, the movement of animals 242, or vehicular traffic 244. Weather conditions 246 might also trigger nuisance alarms such as storm conditions or could cause a sensor/alarm malfunction such as a power surge from a lightning strike. Furthermore, weather conditions 246 such as heavy rain or fog might also obscure cameras and sensors 250 even if they do not trigger an alarm. Natural features such as trees and foliage 234 can potentially trigger alarms under certain conditions such as, e.g., tree branches triggering motion sensors in heavy winds or a downed tree branch causing a sensor malfunction.

The above description of potential causes of false and nuisance alarms is by no means exhaustive but is intended to provide the reader with a sense of the range of distractions that alarm station operators must potentially contend with on a regular basis. This challenge is particularly exacerbated when multiple alarms are triggered concurrently or in close succession, requiring a determination of which alarms to investigate first. Furthermore, one must not lose sight of the fact that real threats and attacks, though rare, are always possible and might even coincide with nuisance alarms.

Illustrative embodiments take advantage of the fact that each alarm 260 begins at a specific time 262 and is associated with the location 254 of the sensor 252 triggering the alarm. This time 262 and location 254 are transmitted to alarm station 202 as spatio-temporal sensor data 206.

Computer system 204 is able to process the spatio-temporal data 206 using pattern recognition algorithms 208. A key distinction between false and nuisance alarms versus genuine threats and attacks is that false and nuisance alarms tend to be random and unrelated to each other in terms of location and time. In contrast, a deliberate attack on a location will tend to follow a discernable pattern. To use a simple example, if an intruder breaches a fence at perimeter 228 and attempts to gain access to one of the buildings 230, the intruder's path within monitored area 226 will produce a discernable a pattern of movement in terms of where and when alarms are triggered as the intruder moves from the perimeter to the building.

If a pattern is detected by the pattern recognition algorithms 208, computer system 204 might also calculate a near-term projection 210 anticipating where the intruder is likely headed. This near-term projection 210 might take into account the locations 232 of buildings and structures 230 as well as natural features 234 within the monitored area 226. Near-term projection 210 can be used to direct responding security personnel 248, 266 to improve response effectiveness.

Computer system 204 might display all information to monitored area 226 on a comprehensive area display 212. In addition, alarm information might also be shared by computer system 204 with a number of work stations 214. Each work station 216 has an interface 218 that can allow an operator to perform one of several functions in response to alarm information. Interface 218 might allow an operator to perform initial alarm triage 220 in which alarms are identified as likely false/nuisance alarms that can be investigated or likely genuine threats that require immediate attention.

Once likely genuine threat alarms have been identified, an operator can use interface 218 to establish situation awareness 222 to develop an overall picture of the emerging status of the monitored area 226 resulting from the alarms. By assessing the alarms together, pattern recognition algorithms 208 can assist the operator to determine if a spatio-temporal pattern exists among the alarms that indicates a deliberate threat to monitored area 226 or if the alarms appear to be unrelated and random.

Situation awareness 222 allows formulation of a threat assessment 224 to determine the goal of a threat (if any) and direct appropriate responses to the threat. Near-term projection 210 can assist with this process by extrapolating a discernable pattern of alarms into the specified future time frame. The appropriate response might involve notifying onsite security and emergency personnel 248 (if any) and/or offsite security and emergency personnel 266 of the threat and properly and directing them to the proper location(s) within monitored area 226.

The processes of alarm triage 220, situation awareness 222, and threat assessment 224 might be performed by different operators using respective work stations 214.

Figure 3:
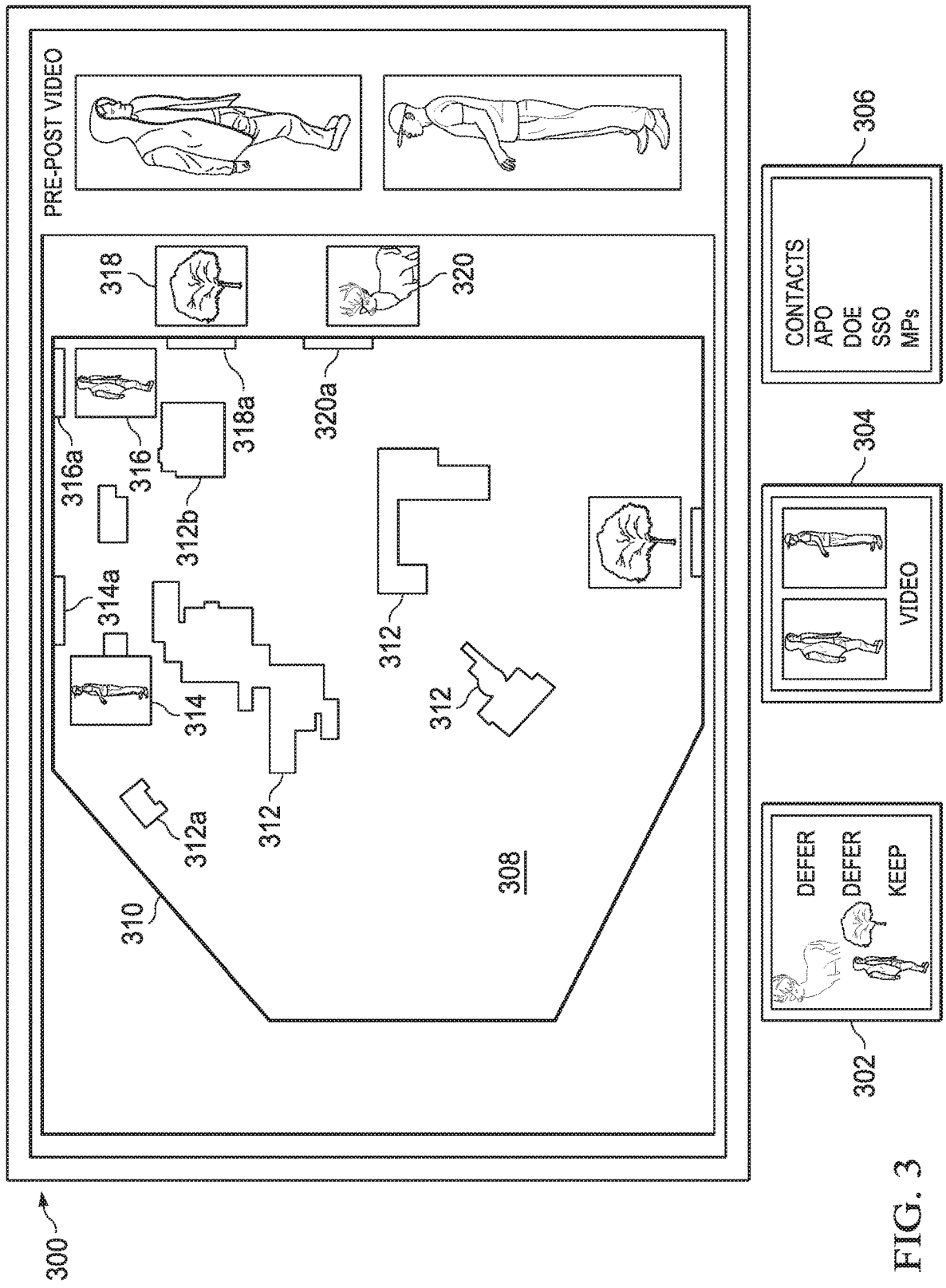
FIG. 3 depicts an example alarm station display and operator interfaces in accordance with an illustrative embodiment.

FIG. 3 depicts an example alarm station display and operator interfaces in accordance with an illustrative embodiment. Area display might be an example of area display 212 in FIG. 2. Similarly, interfaces 302, 304, 306 might be different examples of interface 218.

As depicted, area interface 300 provides a "big picture" view of spatio-temporal alarm data related to entire monitored area 308. This view encompasses a perimeter 310 surrounding monitored area 308 and buildings 312 within the perimeter. In the example shown, area interface 300 displays video images 314, 316, 318, and 320 corresponding to four alarms 314a, 316a, 318a, and 320a occurring around perimeter 310.

Work station interfaces 302, 304, 306 allow operators to perform select functions in relation to the alarm information on area interface 300. Each work station interface displays the information most relevant to the select function. Dividing the functions among different work stations can take advantage of division of labor among the operators at an alarm station.

In the present example, work station interface 302 allows initial assessment by an operator to triage individual alarms. Using a Keep/Defer approach, the operator can keep an alarm data for immediate attention and assessment or defer an alarm for acknowledgment and characterization at a later time (which might involve several time-consuming steps). For example, video image 320 shows a deer that has triggered alarm 320a and can be deferred for the moment, whereas video image 316 shows a person that has triggered alarm 316a and is more likely to present a genuine threat.

Work station interface 304 can be used for a closer analysis of alarm data and images that have been saved from the triage to develop situational awareness of the situation. In the example shown, work station interface 304 is being used to concurrently assess images 314 and 316 more closely.

The spatio-temporal data associated with the images 314, 316 displayed on area interface 300 can help the operators assess the pattern of activity, with assistance from pattern recognition algorithms. For example, if alarms 314a and 316a are triggered simultaneously or in rapid succession, the operators might conclude that two different people have entered the premises. On the other hand, if the time between alarm 314a and 316a is long enough for a person to run or walk between the locations, the operator might conclude that a single person has entered the premises and is moving along perimeter 310.

In addition, near-term projection can be calculated from spatio-temporal pattern recognition to predict where an intruder is headed on the premises. In the example shown in FIG. 3, if alarm 316a was triggered before alarm 314a, near-term projection might indicate the intruder is headed for building 312a. Conversely, if alarm 314a was triggered before alarm 316a, near-term projection might indicate the intruded is headed for building 312b. If it was determined that two intruders have entered the premises, near-term projections might indicate different likely destinations each intruder.

The above examples are very simple for ease of explanation, but even these simple examples illustrate how just a few data points can potentially indicate a variety of very different situations depending on variations in spatio-temporal factors. Each potential situation requires a different response, which often must be initiated within a short response time. Without triage of alarms and assistance from spatio-temporal pattern recognition algorithms, operators can easily become overwhelmed by a rapid succession of alarms, especially if diversionary tactics are being employed by attackers.

Based on the situation awareness facilitated by area interface 300, an operator can use contact information for security response personnel supplied by work station interface 306 to communicate with appropriate personnel and coordinate a security response. The assessment and response might comprise deciding the likely target of an intrusion as well as which and how many response personnel to dispatch and to which location(s). Examples of authorities and response personnel include special security officers (SSO), accountable property officers (APO), military police (MPs), the owner or governing authority of the facility (e.g., Department of Energy), fire fighters, etc.

It should be noted that work station interfaces 302, 304, 306 need not necessarily be displayed on separate work stations. All three interfaces might be used sequentially on a single work station, allowing a single operator to perform all monitoring and assessment functions, possibly with the assistance artificial intelligence (AI) technology to increase the speed and confidence level of decisions.

Figure 4:
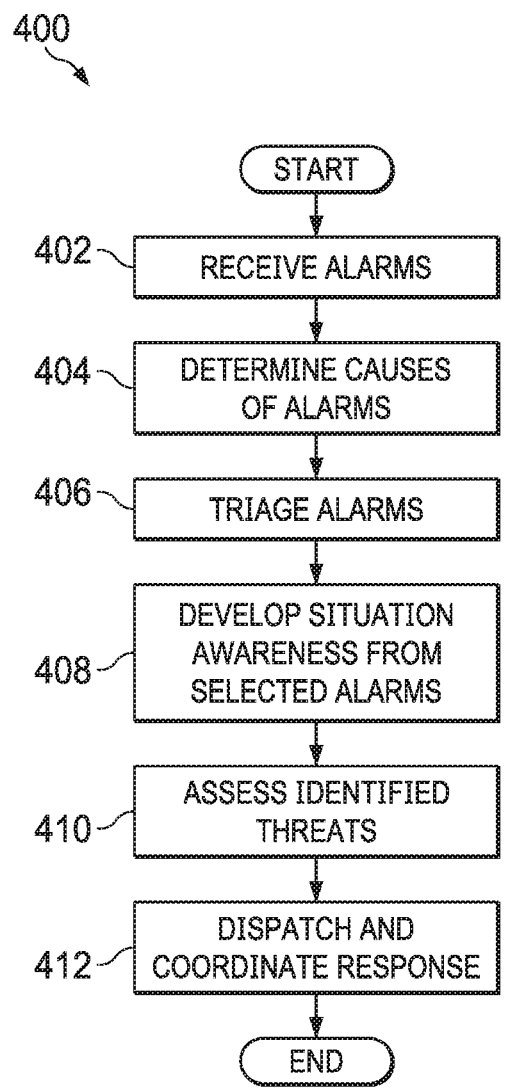
FIG. 4 depicts a flowchart for a process of evaluating security alarms in which illustrative embodiments can be used.

FIG. 4 depicts a flowchart for a process of evaluating security alarms in which illustrative embodiments can be used. Process 400 can be implemented with the security system shown in FIG. 2 and alarm interfaces shown in FIG. 3.

Process 400 begins with an alarm station receiving a number of alarms related to a monitored area (step 402). Operators then determine the likely causes of the alarms (step 404) and triage the individual alarms to separate false or nuisance alarms (e.g., animals, weather, malfunction) from alarms from likely genuine threats (step 406).

After the initial triage of individual alarms, operators formulate situation awareness based on the alarms that are saved from the triage (step 408). Whereas triage comprises an initial assessment of individual alarms, situation awareness is derived from relationships and patterns between the alarms.

If any threats are identified from the situation awareness, the threats are assessed regarding current progress, likely goals or targets, etc. (step 410). If it is likely that intruders or attackers have indeed entered the premises/facilities, the assessment attempts to determine the purpose of the intrusion or at least the most likely next steps of the intruder(s).

From the assessment, alarm station operators can dispatch and coordinate a response to the threat (step 412). The information and situation awareness provided by the alarm station facilitates directing the right response personnel to the right location(s). After the threat has been resolved, the process ends.

Figure 5:
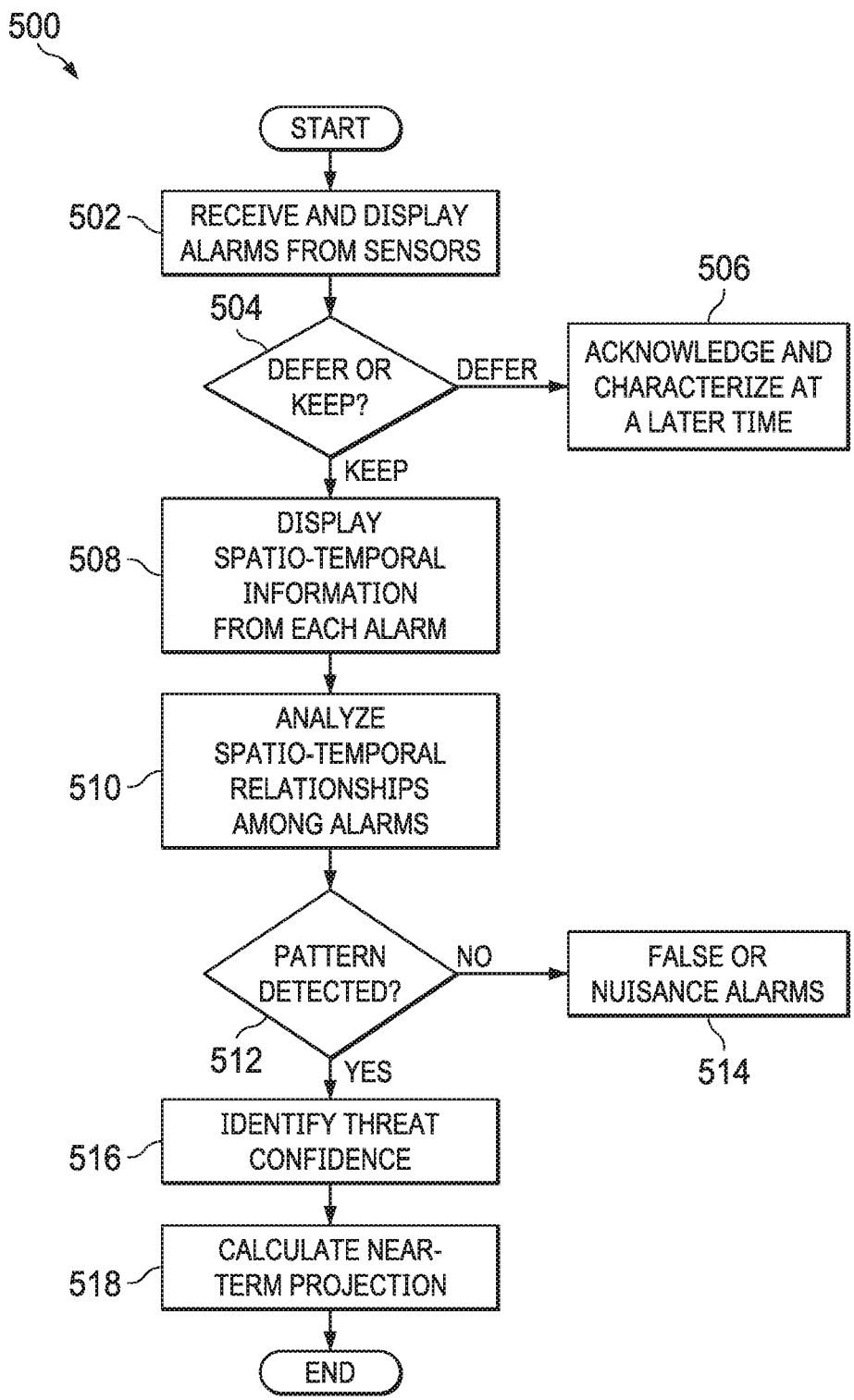
FIG. 5 depicts a flowchart for use of an alarm interface in accordance with illustrative embodiments.

FIG. 5 depicts a flowchart for use of an alarm interface in accordance with illustrative embodiments. Process 500 might employ computer system 204 and interface 218 in FIG. 2 as well as the interfaces shown in FIG. 3. Process 500 can be employed as part of process 400 to increase response speed and confidence level of decision making by alarm station operators.

When alarm sensors generate alarms, the interface receives alarm data from the security sensors generating alarms and displays it to an operator (step 502). The alarm data might comprise spatio-temporal data regarding where and when an alarm is triggered. The alarm data might also include video images.

For each alarm, the interface provides the operator with an option to keep or defer an alarm as part of the initial alarm triage (step 504). If the operator elects to defer an alarm, the interface saves the alarm for formal acknowledgement and characterization by the operator at a later time (step 506). Typically, an operator is often able to make a quick, initial assessment of an alarm based on the data provided by the sensors (e.g., an image of an animal versus an image of the person). However, many security policies and procedures require a formal acknowledgement and characterization of each alarm. This process might comprise manually working through multiple pull-down menus and check boxes to indicate the type of each alarm (i.e., false, nuisance, genuine) and the cause, if known (e.g., weather, wildlife, intruder). If an operator has to perform this acknowledgment and characterization process for each alarm in real-time, the operator or team of operators can easily become overwhelmed when confronted with a cascade of alarms in rapid succession, causing a critical bottleneck at the very beginning of the response process. By selecting Defer, an operator can save the formal acknowledge procedure for after a security threat situation has been resolved.

If the operator determines the alarm is likely genuine and elects to keep the alarm for continued assessment, the interface displays the spatio-temporal information related to the alarm (step 508). The interface then assists the operator to analyze spatio-temporal relationships, if any, among the alarms (step 510). As mentioned above, genuine intrusions and attacks will trigger alarms in patterns consistent with deliberate action, whereas false or nuisance alarms caused by senor malfunctions or animals will occur randomly with no pattern.

By displaying and analyzing spatio-temporal relationships among a number of alarms, rather than assessing them only individually, the interface, with the assistance of pattern recognition algorithms, enables the operator to establish situation awareness and determine if any patterns are detected among the alarms (step 512). This step becomes increasingly important as the number of alarms increases.

If no pattern is detected, the alarms can be identified and disposed of as false or nuisance alarms (step 514). Step 514 might also apply to a subset of the alarms. Using the extreme example of an attack against a facility employing diversions, the diversion alarms are unlikely to display a pattern similar to intruders moving toward a target.

If the alarms, or a subset of alarms, display a discernable pattern, they are identified as genuine alarms representing one or more credible threats (step 516). In an embodiment, the threat can be assigned a confidence score by pattern recognition algorithms.

Once a genuine threat has been identified, the interface can use the underlying pattern to calculate a spatio-temporal near-term projection of threat progression over a specified future time frame, i.e. where the threat (intruder) is headed on the premises (step 518). This near-term projection can facilitate the direction and coordination of response personnel to the correct location. After the threat has been resolved, the process ends.

Figure 6:
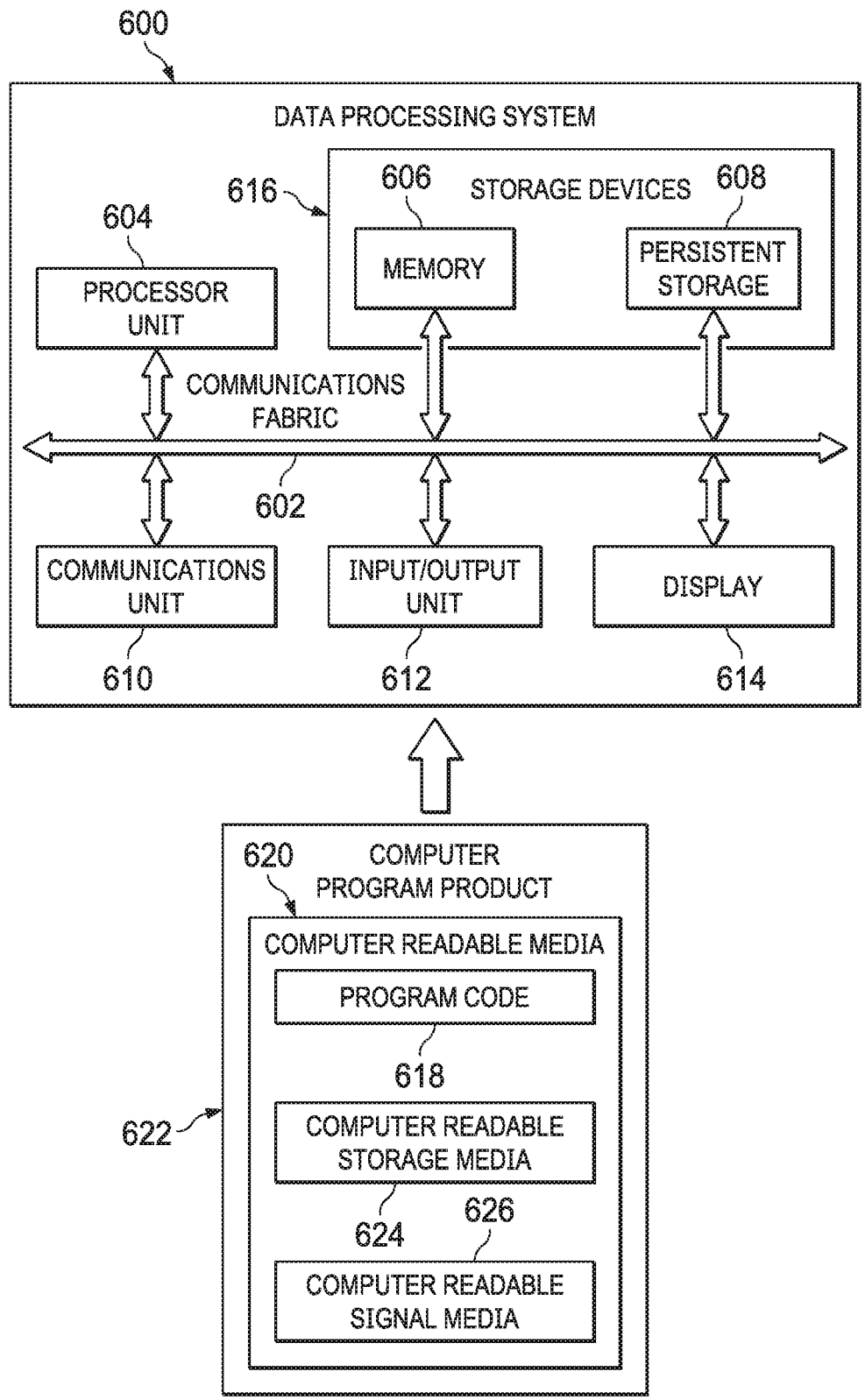
FIG. 6 is a diagram of a data processing system depicted in accordance with an illustrative embodiment.

Turning to FIG. 6, a diagram of a data processing system is depicted in accordance with an illustrative embodiment. Data processing system 600 is an example of a system in which computer-readable program code or program instructions implementing processes of illustrative embodiments may be run. Data processing system 600 may be used to implement one or more computers and client computer system 112 in FIG. 1. In this illustrative example, data processing system 600 includes communications fabric 602, which provides communications between processor unit 604, memory 606, persistent storage 608, communications unit 610, input/output unit 612, and display 614.

Processor unit 604 serves to execute instructions for software applications and programs that may be loaded into memory 606. Processor unit 604 may be a set of one or more hardware processor devices or may be a multi-processor core, depending on the particular implementation. Further, processor unit 604 may be implemented using one or more heterogeneous processor systems, in which a main processor is present with secondary processors on a single chip. As another illustrative example, processor unit 604 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 606, in these examples, may be, for example, a random access memory, or any other suitable volatile or non-volatile storage device. Persistent storage 608 may take various forms, depending on the particular implementation. For example, persistent storage 608 may contain one or more devices. For example, persistent storage 608 may be a hard drive, a flash memory, a rewritable optical disk, a rewritable magnetic tape, or some combination of the above. The media used by persistent storage 608 may be removable. For example, a removable hard drive may be used for persistent storage 608.

Communications unit 610, in this example, provides for communication with other computers, data processing systems, and devices via network communications unit 610 may provide communications using both physical and wireless communications links. The physical communications link may utilize, for example, a wire, cable, universal serial bus, or any other physical technology to establish a physical communications link for data processing system 600. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 600.

Input/output unit 612 allows for the input and output of data with other devices that may be connected to data processing system 600. For example, input/output unit 612 may provide a connection for user input through a keypad, keyboard, and/or some other suitable input device. Display 614 provides a mechanism to display information to a user and may include touch screen capabilities to allow the user to make on-screen selections through user interfaces or input data, for example.

Instructions for the operating system, applications, and/or programs may be located in storage devices 616, which are in communication with processor unit 604 through communications fabric 602. In this illustrative example, the instructions are in a functional form on persistent storage 608. These instructions may be loaded into memory 606 for running by processor unit 604. The processes of the different embodiments may be performed by processor unit 604 using computer-implemented program instructions, which may be located in a memory, such as memory 606. These program instructions are referred to as program code, computer-usable program code, or computer-readable program code that may be read and run by a processor in processor unit 604. The program code, in the different embodiments, may be embodied on different physical computer-readable storage devices, such as memory 606 or persistent storage 608.

Program code 618 is located in a functional form on computer-readable media 620 that is selectively removable and may be loaded onto or transferred to data processing system 600 for running by processor unit 604. Program code 618 and computer-readable media 620 form computer program product 622. In one example, computer-readable media 620 may be computer-readable storage media 624 or computer-readable signal media 626. Computer-readable storage media 624 may include, for example, an optical or magnetic disc that is inserted or placed into a drive or other device that is part of persistent storage 608 for transfer onto a storage device, such as a hard drive, that is part of persistent storage 608. Computer-readable storage media 624 also may take the form of a persistent storage, such as a hard drive, a thumb drive, or a flash memory that is connected to data processing system 600. In some instances, computer-readable storage media 624 may not be removable from data processing system 600.

Alternatively, program code 618 may be transferred to data processing system 600 using computer-readable signal media 626. Computer-readable signal media 626 may be, for example, a propagated data signal containing program code 618. For example, computer-readable signal media 626 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 618 may be downloaded over a network to persistent storage 608 from another device or data processing system through computer-readable signal media 626 for use within data processing system 600. For instance, program code stored in a computer-readable storage media in a data processing system may be downloaded over a network from the data processing system to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to, or in place of, those illustrated for data processing system 600. Other components shown in FIG. 6 can be varied from the illustrative examples shown. The different embodiments may be implemented using any hardware device or system capable of executing program code. As one example, data processing system 600 may include organic components integrated with inorganic components and/or may be comprised entirely of organic components excluding a human being. For example, a storage device may be comprised of an organic semiconductor.

As another example, a computer-readable storage device in data processing system 600 is any hardware apparatus that may store data. Memory 606, persistent storage 608, and computer-readable storage media 624 are examples of physical storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606 or a cache such as found in an interface and memory controller hub that may be present in communications fabric 602.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for analyzing security alarms, the method comprising:
   receiving, by a number of processors, alarm data from a number of security sensors generating alarms, wherein the alarm data includes spatio-temporal data regarding where and when a number of alarms are triggered;
   displaying, by the number of processors, the alarm data on a user interface;
   analyzing, by the number of processors, the alarm data for spatio-temporal relationships among the number of alarms according to a number of pattern recognition algorithms;
   identifying, by the number of processors, one or more of the number of alarms as genuine if a discernable pattern is recognized among the number of alarms; and
   assigning, by the number of processors, a threat confidence level to alarms of the number of alarms identified as genuine.

2. The method of claim 1, further comprising displaying individual alarms of the number of alarms on the user interface and providing a user selection option to:
   defer an individual alarm for later acknowledgment and characterization; and
   keep an individual alarm for immediate analysis.

3. The method of claim 1, wherein alarm data further comprise video images.

4. The method of claim 1, further comprising calculating, by the number of processors, a spatio-temporal near-term projection of threat progression over a specified future time frame according to recognized patterns for alarms of the number of alarms identified as genuine.

5. The method of claim 1, further comprising displaying on the interface, by the number of processors, contact information for security response personnel.

6. The method of claim 1, further comprising identifying, by the number of processors, alarms of the number of alarms as false or nuisance alarms if no discernable pattern is recognized among the alarms of the number of alarms.

7. A computer program product for analyzing security alarms, the computer program product comprising:
   a non-volatile computer readable storage medium having program instructions embodied therewith, the program instructions executable by a number of processors to cause the computer to perform the steps of:
      receiving alarm data from a number of security sensors generating alarms, wherein the alarm data includes spatio-temporal data regarding where and when a number of alarms are triggered;
      displaying the alarm data on a user interface;
      analyzing the alarm data for spatio-temporal relationships among the number of alarms according to a number of pattern recognition algorithms;
      identifying one or more of the number of alarms as genuine if a discernable pattern is recognized among the number of alarms; and
      assigning, by the number of processors, a threat confidence level to alarms of the number of alarms identified as genuine.

8. The computer program product of claim 7, further comprising instruction for displaying individual alarms of the number of alarms on the user interface and providing a user selection option to:
   defer an alarm of the individual alarms for later acknowledgment and characterization; or
   keep an alarm of the individual alarms for immediate analysis.

9. The computer program product of claim 7, wherein alarm data further comprise video images.

10. The computer program product of claim 7, further comprising instructions for calculating a spatio-temporal near-term projection of threat progression over a specified future time frame according to recognized patterns for alarms of the number of alarms identified as genuine.

11. The computer program product of claim 7, further comprising instructions for displaying on the interface contact information for security response personnel.

12. The computer program product of claim 7, further comprising instructions for identifying alarms of the number of alarms as false or nuisance alarms if no discernable pattern is recognized among the alarms of the number of alarms.

13. A system for analyzing security alarms, the system comprising:
a bus system;
a number of storage devices connected to the bus system, wherein the number of storage devices store program instructions; and
a number of processors connected to the bus system, wherein the number of processors execute the program instructions to:
receive alarm data from a number of security sensors generating alarms, wherein the alarm data includes spatio-temporal data regarding where and when is a number of alarms are triggered;
display the alarm data on a user interface;
analyze the alarm data for spatio-temporal relationships among the number of alarms according to a number of pattern recognition algorithms;
identify one or more of the number of alarms as genuine if a discernable pattern is recognized among the number of alarms; and
assign a threat confidence level to alarms of the number of alarms identified as genuine.

14. The system of claim 13, wherein the number of processors further execute instructions to display individual alarms of the number of alarms on the user interface and provide a user selection option to:
defer an alarm of the individual alarms for later acknowledgment and characterization; or
keep an alarm of the individual alarms for immediate analysis.

15. The system of claim 13, wherein the number of processors further execute instructions to calculate a spatio-temporal near-term projection of threat progression over a specified future time frame according to recognized patterns for alarms of the number of alarms identified as genuine.

16. The system of claim 13, wherein the number of processors further execute instructions to display on the interface contact information for security response personnel.

17. The system of claim 13, wherein the number of processors further execute instructions to identify alarms of the number of alarms as false or nuisance alarms if no discernable pattern is recognized among the alarms of the number of alarms.

18. The method of claim 2 further comprising:
assigning, by the number of processors, a type to the individual alarm that has been deferred; and
assigning, by the number of processors, a cause to the individual alarm that has been deferred.

19. The computer program product of claim 8, further comprising instructions for:
assigning a type to the individual alarm that has been deferred; and
assigning a cause to the individual alarm that has been deferred.

20. The system of claim 14, wherein the number of processors further execute instructions to:
assign a type to the individual alarm that has been deferred; and
assign a cause to the individual alarm that has been deferred.

* * * * *